219-121 SR
11/4/86 OR 4,621,184

United States Patent [19]

Vancata

[11] Patent Number: 4,621,184

[45] Date of Patent: Nov. 4, 1986

[54] OPTICAL MONITORING DEVICE FOR DETERMINING FAULTS IN A PLASMA BURNER

[75] Inventor: Oldrich Vancata, Skultuna, Sweden

[73] Assignee: Asea Aktiebolag, Sweden

[21] Appl. No.: 667,454

[22] Filed: Nov. 1, 1984

[30] Foreign Application Priority Data

Nov. 14, 1983 [SE] Sweden ................................ 8306249

[51] Int. Cl.[4] ................................................ B23K 15/00

[52] U.S. Cl. .......................... 219/121 PY; 219/121 P; 219/121 PH; 219/130.21; 315/111.21; 356/316

[58] Field of Search ...... 219/121 PA, 121 P, 121 PY, 219/121 PM, 121 PT, 121 PW, 121 PH, 124.02, 124.03, 137 R, 130.21; 356/316, 311; 156/643, 345, 646; 315/111.21

[56] References Cited

U.S. PATENT DOCUMENTS 3,602,683 8/1971 Hishida et al. ............... 219/121 PU
4,093,844 6/1978 Fellure et al. .................. 219/124.02
4,328,068 5/1982 Curtis .......................... 219/121 PG
4,446,354 5/1984 Kearney ........................ 219/130.01

FOREIGN PATENT DOCUMENTS 14-14375 7/1939 Japan .............................. 219/121 P

*Primary Examiner*—M. H. Paschall

[57] ABSTRACT

A device for monitoring the arc of a plasma burner employs a photo-sensitive device to receive light from the plasma arc via at least one narrow band filter, the wavelength range of the filter being centered on the spectral response characteristic of a material in the burner or the plasma nozzle. A monitoring circuit detects when the output of the photo-sensitive device increases, indicating fault conditions in the arc.

1 Claim, 4 Drawing Figures

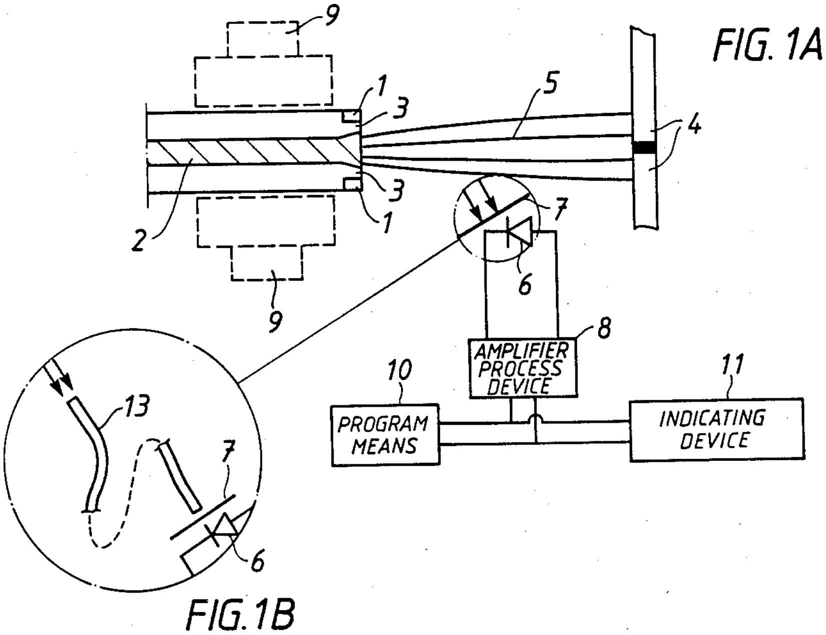
FIG. 1A
FIG. 1B
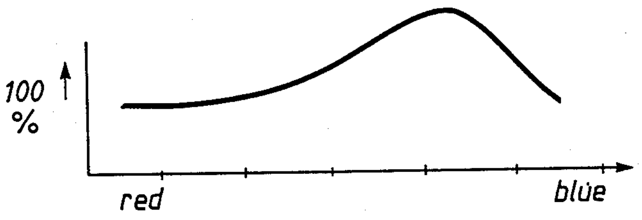
FIG. 2A
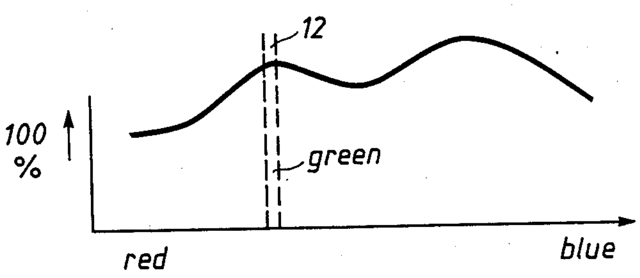
FIG. 2B

OPTICAL MONITORING DEVICE FOR DETERMINING FAULTS IN A PLASMA BURNER

BACKGROUND OF THE INVENTION

1. Field of the Invention

The present invention relates to a device for monitoring the performance of a plasma burner with a view to warning and/or taking evasive action in the event of the appearance of fault conditions in the plasma arc of such a burner or the appearance of conditions presaging a fault in such a burner.

2. Discussion of Prior Art

One problem when using a plasma burner for cutting is that there is no feedback to the user in the case of a short-circuit or a worn nozzle. The cutting efficiency of the burner deteriorates but the "handle" of the burner is unchanged and a substantial amount of inferior cut material may result before the user realises that a less than optimum arc is being generated by the burner. With a mechanical cutter however, a reduction in cutting efficiency is immediately sensed by the operator making it an easy matter to detect (and thus correct) fading cutting efficiency.

In the case of robot-controlled cutting equipment it is highly desirable to have some automatic means for monitoring the cutting efficiency of the equipment and in the case of plasma burners there has, heretofore, been no satisfactory way of monitoring the burner efficiency so that robot-motivated action can be taken to prevent sub-standard cuts being made.

At the present time the nozzle of a plasma burner is replaced after a certain period of use, and the only inspection of used nozzles that normally takes place is an after-inspection following replacement.

OBJECTS OF THE INVENTION

When a nozzle has been used for a long time in a plasma burner for cutting purposes, there is a considerable risk that the material becomes incorrectly cut, and one object of the invention is to prevent that risk. A further object of the invention, when cutting with a plasma burner mounted in the grippers of a robot, is to be able to interrupt the robot program or move the burner to one side if the burner performance deteriorates as in the case of a short-circuit in the burner.

SUMMARY OF THE INVENTION

The invention provides a plasma burner monitoring device which is characterized in that at least one photosensitive device is arranged to be mounted adjacent the plasma burner, said device being provided with at least one filter (e.g. an interference filter) which is designed to admit a narrow wavelength range within a region specific to some material in the burner or the plasma nozzle thereof which will contaminate the arc when its performance becomes less than the optimum.

During normal operation with a plasma burner, for example for cutting, the arc generates, among other things, a very intense violet light. In the event of a short-circuit, or when a nozzle has worn down, some material in the burner, which may be copper or brass, for example, is ionized. In the case of such an event, the light emitted by the arc assumes a greenish shade. For each contaminating material the ionization arc spectrum has a particular color having a characteristic spectral response which peaks at a unique frequency, and it is this phenomenon that is utilized in a device according to the invention. The appearance of such a peak is made use of for indicating a loss of optimum performance and for taking some sort of remedial action.

In a robot-mounted plasma burner, for example, the output signal from a signal processing device connected to the photosensitive device can be adapted to be supplied to the robot program control means, the robot thus being stopped and/or the burner and/or the cutting object being moved aside. The power supply to the burner may possibly be cut off.

BRIEF DESCRIPTION OF THE DRAWING

The invention will now be exemplified in greater detail, by way of example, in the accompanying drawing, in which:

FIG. 1A is a schematic diagram illustrating the invention in the case of a plasma cutting tool, FIG. 1B shows a modification for the circled portion of FIG. 1A, and FIGS. 2A and 2B show spectral curves relating to the wavelength distribution of the light from a plasma arc in the case of normal welding and when a fault arises, respectively.

DESCRIPTION OF PREFERRED EMBODIMENTS

FIG. 1A shows a plasma burner with a cathode 1, an anode 2 and a plasma arc 5 obtained from the channel 3. The arc 5 has a high temperature and is used here for cutting the objects 4.

At or adjacent the plasma arc 5, a photo-sensitive device 6 (e.g. a photodiode or photoelectric cell), is located, the device 6 being provided with at least one interference filter 7. It is, of course, possible to use a light guide between the arc 5 and the device 6 if it is desirable to locate the device 6 at a distance from the arc 5. FIG. 1B shows such a light guide at 13.

The output signal from the device 6 is supplied to an amplifier/signal processing device 8. The output signal from the device 8 may be supplied to an indicating device 11 (a meter, an audible alarm or light signal, for example) and/or may be supplied to the control program means 10 of a robot schematically indicated at 9. Also, the appearance of a fault signal may be allowed to change the robot program so that, for example, the nozzle is automatically replaced, the cutting object or burner is moved aside and/or the current to the burner is interrupted.

During normal cutting, for example using a copper nozzle, the spectral distribution of the light from the plasma arc may have an appearance such as that shown in FIG 2A. In case of contamination of the plasma arc (e.g. by a short-circuit) a green "hump" is obtained in the curve (as is shown in FIG 2B). If a narrow region 12 in the green zone, which is characteristic of or specific to copper, is allowed to pass through the filter 7 which blocks all other colors, an immediate indication of fault conditions (or in ideal conditions the precursor of fault conditions) will be obtained by monitoring the amplitude of light in the "window" 12.

The location of the "window" 12 needs to be different for different ionised materials, and the filter 7 must, therefore, be adapted to the particular contaminating burner material in question. When using an interference filter with a very narrow spectral window 12 and a correct amplification, copper or other materials in the spectrum can be indicated with a very high degree of sensitivity.

The device illustrated can be varied in many ways within the scope and spirit of the appended claims.

What is claimed is:

1. A method of detecting the presence of contamination materials in a plasma arc produced by a plasma burner which comprises monitoring the spectral output from the plasma arc of the burner for the characteristic spectral response of at least one contaminating element whose concentration in the arc is expected to increase when faulty operation of the burner occurs and generating a signal output with the presence of said at least one contaminating element in said arc.

* * * * *